United States Patent Office 2,753,428
Patented July 3, 1956

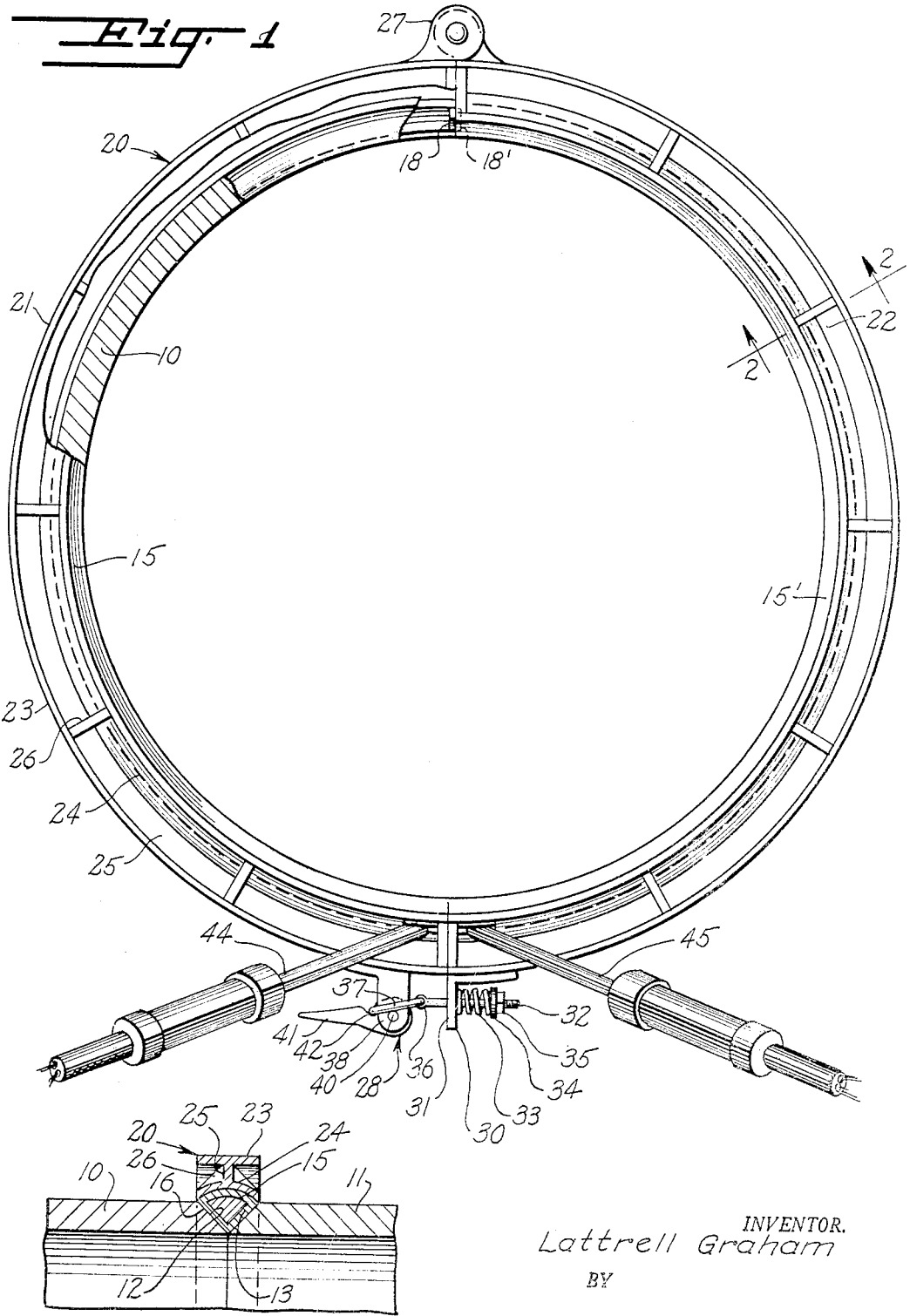

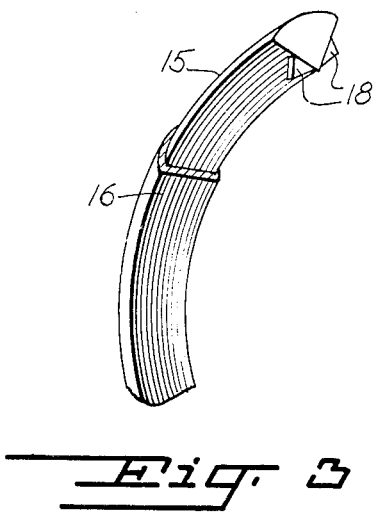
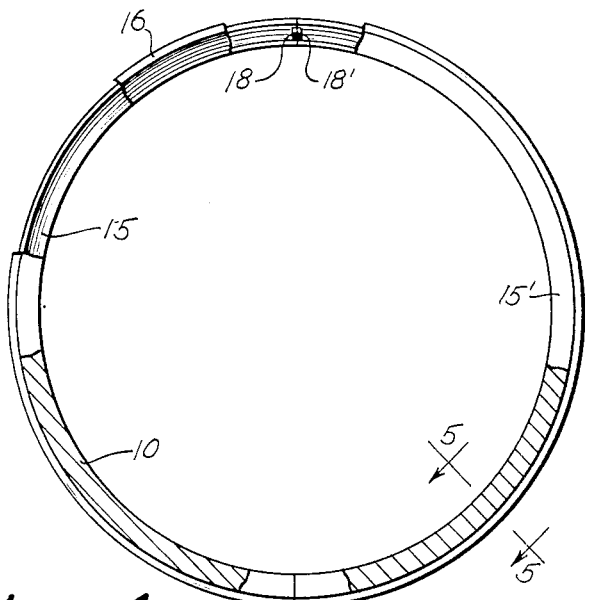
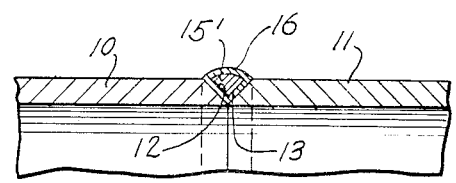
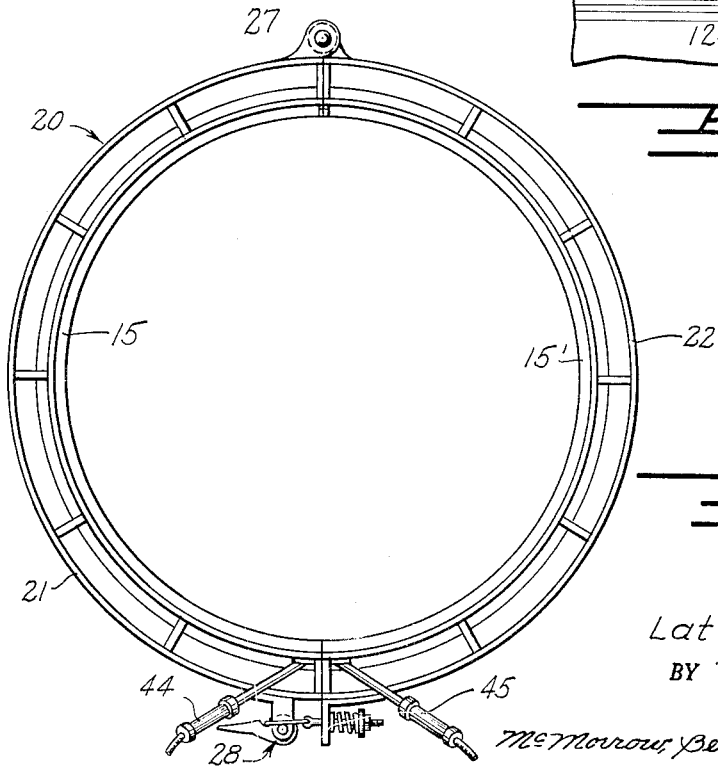

2,753,428

METHOD AND APPARATUS FOR BUTT WELDING PIPE SECTIONS

Lattrell Graham, Amarillo, Tex.

Application June 5, 1953, Serial No. 359,797

2 Claims. (Cl. 219—10)

This invention relates to a method and apparatus for butt welding the juxtaposed beveled ends of pipe sections together and more particularly for welding together the abutting ends of large diameter, steel pipe sections, such as are used for gas and oil pipe lines and water mains.

It is among the objects of the invention to provide an improved method of butt welding the ends of large pipe sections which substantially eliminates the difficulties of overhead and side welding of such sections and substantially eliminates distortion of the pipe sections and cracking of the weld joints by the welding heat; which greatly facilitates and materially reduces the time and expense of the welding operation; which utilizes preformed bodies of welding material shaped to provide a smooth and continuous weld between abutting pipe section ends and apparatus firmly holding the preformed welding rods in proper position relative to the associated pipe sections during the welding operation; which performs the welding operation rapidly and continuously and simultaneously around opposite sides of the weld joint to eliminate distortion of the joint by the welding heat; and which utilizes simplified apparatus which is economical to manufacture and easy to use, and which may be reused for a large number of weld joints.

Other objects and advantages will become apparent from a consideration of the following description and the appended claims in conjunction with the accompanying drawing wherein:

Figure 1 is an end elevational view of assembled apparatus for carrying out the welding process of the invention with an associated pipe section fragmentarily shown in cross section;

Figure 2 is a fragmentary cross sectional view on the line 2—2 of Figure 1;

Figure 3 is a fragmentary perspective view of a preformed welding material ring section constituting an operative component of the apparatus;

Figure 4 is a transverse cross sectional view through a pipe section with parts of the pipe section broken away to show an internal step in the process of butt welding the abutting ends of two adjacent pipe sections;

Figure 5 is a fragmentary cross sectional view on the line 5—5 of Figure 4; and

Figure 6 is an end elevational view similar to Figure 1 showing a final step in the butt welding process.

With continued reference to the drawing, two pipe sections are indicated at 10 and 11 having externally beveled ends 12 and 13 disposed in juxtaposed or abutting relationship with the pipe sections held coaxially of each other by known means, such as suitable jacks, or by spot welding the pipe sections together internally thereof. The external bevels on the abutting ends of the pipe sections provide a weld groove of V cross sectional shape extending entirely around the abutting ends of the pipe sections and providing a weld joint groove. This arrangement is known to the prior art, and it is customary to weld the abutting ends of the pipe sections together by filling in the groove between the beveled end surfaces 12 and 13 with welding material, either by hand welding or by a welding machine mounted on the pipe sections and moved around the pipe sections to carry a welding electrode around the groove. This previously practiced welding method is subject to serious difficulties, among which are the difficulties of overhead welding along the bottom portion of the weld joint groove where it is extremely difficult to cause the molten weld material to adhere to the ends of the pipe sections and remain in proper position in the groove, the difficulty of welding along the sides of the groove where the molten welding material tends to run down out of the groove and to fail to adhere properly to the beveled surfaces of the pipe sections, and the distortion of the pipe sections and the weld joint caused by the local application of welding heat to the pipe sections at the location around the groove at which the welding operation is being performed at any one time.

In accordance with the present invention, the welding material is first preformed in any suitable manner into solid bodies or ring sections, as designated at 15 in Figure 3, each of semicircular shape having an inside radius equal to the radius of the bottom or inner edge of the V-shaped weld joint grooves between the beveled pipe section ends, and a cross sectional shape conforming in size and shape to the V-shaped cross section of the groove. The cross sectional shape of a welding body 15, as illustrated in Figure 2, thus includes straight sides extending divergently from a point of intersection, and a longitudinally curved third or base side extending between the ends of the straight sides remote from the point of intersection of the latter and providing a transversely convex annular or peripheral surface at the outer side of the semicircular body. The welding material body is somewhat smaller in cross sectional area than the cross sectional area of the welding groove, and a coating of electrically insulative flux material 16 is provided on the outer surface of the welding body and is of a thickness such that the composite body including the body of welding material and the coating of flux fits exactly into the welding groove between the beveled pipe section ends.

Two of the coated bodies 15 and 15' are disposed in the welding groove at respectively opposite sides of the pipe sections, and when so disposed, the two bodies form a ring extending entirely around the weld joint groove completely filling this groove with a layer of electrically insulative flux material interposed between the welding ring sections and the beveled surfaces of the ends of the pipe sections. Each ring section 15 and 15' is provided at one end thereof with a sharp projection, as indicated at 18 and 18' which extends through the coating of flux material and makes an electrically conductive contact with the end surfaces of the pipe sections, and the ring sections 15 and 15' are preferably so disposed around the pipe sections that the contact projections are disposed at abutting ends of the two welding material ring sections.

After the welding material sections 15 and 15' are placed around the abutting, beveled ends of the pipe sections, they are held in place by a ring clamp, generally indicated at 20, and comprising two semicircular parts 21 and 22 disposed in end to end relationship, the clamp having an inside diameter equal to the outside diameter of the welding ring sections 15 and 15' when properly positioned in the weld joint groove between abutting pipe section ends.

While two preformed welding material ring sections of semicircular shape are illustrated, it is to be understood that a larger number of shorter welding ring sections may be used without in any way exceeding the scope of the invention.

Each of the parts 21 and 22 of the clamp comprises an outer ring 23 of elongated, rectangular cross sectional shape longitudinally curved to semicircular shape, an inner ring 24 also longitudinally curved to semicircular shape and transversely curved, so that its inner surface provides a shallow groove which closely fits the transversely convex outer or peripheral surface of the corresponding body 15 or 15' of welding material. The inner ring 24 is circumspatially disposed within the outer ring 24, and a web 25 may extend between the two rings medially of the width of both rings and this web may be reinforced by radially disposed ribs 26 extending transversely of the web between the inner and outer rings at angularly spaced apart locations around the rings. The inner ring is preferably formed of a material of good heat conductivity, such as copper, and the outer ring is preferably formed of a material of high structural strength, such as steel, and constitutes a reinforcement for the inner ring.

The two parts 21 and 22 of the clamp ring 20 are hingedly connected together at adjoining ends of a hinge connection 27 having its hinge pin disposed somewhat outwardly of the outer surfaces of the two parts of the clamp ring, and are releasably secured together at their opposite ends by a ring tightening clasp, generally indicated at 28.

The clasp 28 may be of a form well known to the art, but in the form illustrated, comprises a lug 30 mounted on the outer side of the ring portion 22 at the end of this ring portion to be connected to the adjacent end of the ring portion 21, the lug being of right angular shape and having one portion disposed upon and rigidly secured to the outer ring element 23 of the clamp ring portion 22 and a portion 31 projecting perpendicularly outwardly from the ring portion 22 and extending transversely thereof, the lug portion 31 being provided with an aperture receiving a pin 32. A compression spring 33 surrounds the pin 32 at the side of the lug remote from the adjacent end of the ring member 21 and an abutment washer 34 is secured on the corresponding end of the pin by a nut 35 screw threaded onto the externally screw threaded end of the pin, the spring 33 acting between the abutment washer 34 and the lug portion 31 to resist movement of the pin 32 in a direction beyond the adjacent end of the associated clamp ring member 22. At its other end, the pin 32 is provided with a transversely extending sleeve formation 36 and a rectangular ring 37 has one side thereof received in this sleeve formation. A pair of lugs 38 project radially outwardly from the ring member 21 at the end of this member adjacent the lug 30 and are apertured near their outer ends to receive a pivot pin 40. A clamp handle 41 is provided at one end with a transversely extending aperture receiving the pivot pin 40 and is provided at a location spaced from the aperture with a transversely extending notch or recess 42 which receives the side of the rectangular ring 37 opposite the sleeve formation 36.

When clamping the ends of the clamp ring sections 21 and 22 together, after the ends of the ring sections are brought to a location adjacent each other, the clamp handle 41 is swung to a position at which it extends from the pivot pin 40 toward the lug 30 and is then passed through the rectangular ring 37. The clamp handle or lever 41 is then turned about the pivot pin 40 until the side of the ring 37 opposite the sleeve formation 36 is carried over the outer ends of the lugs 38 and brought to a position somewhat inwardly of the pivot pin 40 in a direction from this pivot pin to the outer ring portion 23 of the associated clamp ring section 21, so that the lever is moved over center and the clamp is releasably locked in position. The compression spring 33 provides for movement of the clamp lever in the manner explained above, and resiliently forces the adjacent ends of the clamp ring sections 21 and 22 toward each other.

After the two sections of the clamp ring 20 have been secured together to hold the welding ring sections 15 in position in the welding joint groove between the abutting ends of the pipe sections, welding machine electrodes are connected one to each of the welding ring sections 15 and 15' at the ends thereof remote from the ends thereof carrying the projections making electrically conductive contact with the end surfaces of the pipe sections.

It will be noted that the coating of electrically insulative flux material completely encases each welding ring section, so that these sections are electrically insulated from the inner ring portions 24 of the clamping ring sections, as illustrated in Figure 2.

The electrodes 44 and 45 may extend from a single machine or from two different machines adjusted to substantially the same current capacity and, after the electrodes are properly connected to the welding ring sections, the welding machines are placed in operation at a predetermined current capacity and are maintained in operation for a time interval sufficient to melt the flux material surrounding the preformed welding ring sections and heat them to welding temperature.

When the welding current is applied to the preformed welding ring sections, the same will be heated throughout their length and heat will be transferred therefrom through the coating of flux material to the adjacent ends of the pipe sections, thereby raising the temperature of the pipe section ends entirely around the weld joint. Arcing of the current between the welding ring sections and the ends of the pipe sections will occur first, however, at the ends of the preformed ring sections having the projections making electrically conductive contact with the ends of the pipe sections. It is to be understood that these projections are not of sufficient extent to carry the entire welding current, but are provided merely to start the arcing of the current at the corresponding ends of the preformed welding ring sections. This arcing of the welding current causes the flux at the corresponding ends of the welding ring section to melt and evaporate and also causes the material of the welding ring sections to melt at ends thereof remote from the ends to which the electrodes are connected. As the welding material is a very poor conductor of electric current while in a molten condition, as the material melts the arcing of the current will move progressively around the weld joint until it reaches the ends of the welding ring sections to which the electrodes are connected, the entire length of each section being thereby fused into a weld joint with the adjacent pipe section surfaces when the welding operation is completed. As soon as the ends of the welding ring sections, to which the electrodes are connected, have been welded to the ends of the pipe sections, the welding current is discontinued and the weld joints permitted to cool. It is to be understood that it is not necessary to completely melt all of the welding material, but that a satisfactory weld joint will be provided by heating the welding ring sections and the adjacent ends of the pipe sections to a predetermined temperature and then fusing the weld rods to the ends of the pipe sections by the progressively moving electric arc, as described above.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a process of butt welding together beveled ends of pipe sections, the steps of holding level the pipe section ends together so as to form a V-shaped groove extending around the pipe sections, confining in the groove a ring of welding material, insulating the ring from the groove with flux material, the ring being composed of at least two ring sections having at one of their opposite ends projections in abutting relation to each other for providing preliminary electrical contact between such ring sections and the pipe sections and being insufficient to carry full welding current, applying welding current to the other ends of the ring sections to effect initial fusing of said projections thereby starting an arc to cause the flux material to melt and effect fusing of the welding material, and continuing the application of welding current until the welding ring sections are at least partially melted in contact with the groove.

2. In a process of butt welding together beveled ends of pipe sections, the steps of holding level the pipe section ends together so as to form a V-shaped groove extending around the pipe sections, confining in the groove a ring of welding material, insulating the ring from the groove with flux material, the ring being composed of at least two ring sections having at one of their opposite ends projections in abutting relation to each other providing an electrical contact between such ring sections and the pipe sections, and being insufficient to carry full welding current, applying welding current to the other ends of the ring sections to effect initial fusing of said projections thereby starting an arc to cause the flux material to melt and effect fusing of the welding material, and continuing the application of welding current until the welding ring sections are at least partially melted in contact with the groove, the confining of the welding ring being done by surrounding and engaging the welding ring with a heat conducting medium of unyielding character, said medium being initially in contact only with the flux material.

References Cited in the file of this patent

UNITED STATES PATENTS

| | | |
|---|---|---|
| 1,041,525 | Strohmenger | Oct. 15, 1912 |
| 1,972,029 | Norquist | Aug. 28, 1934 |
| 2,009,240 | Roberts et al. | July 23, 1935 |
| 2,146,601 | Somerville | Feb. 7, 1939 |
| 2,220,576 | MacKusick | Nov. 5, 1940 |
| 2,269,369 | Hafergut | Jan. 6, 1942 |
| 2,347,914 | Kricker | May 2, 1944 |